United States Patent
Taylor

(10) Patent No.: US 6,651,687 B2
(45) Date of Patent: Nov. 25, 2003

(54) PRESSURE RELIEF SYSTEM WITH CLUTCH ACTIVATED VALVE

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 0 days.

(21) Appl. No.: 10/071,594

(22) Filed: Feb. 8, 2002

(65) Prior Publication Data

US 2003/0150490 A1 Aug. 14, 2003

(51) Int. Cl.$^7$ ............................................. F16K 31/163
(52) U.S. Cl. ...................... 137/70; 137/467; 137/488; 251/58; 251/63.4
(58) Field of Search ........................... 137/70, 71, 467, 137/488; 251/58, 62, 63.4

(56) References Cited

U.S. PATENT DOCUMENTS

| | | | |
|---|---|---|---|
| 3,650,506 A | * | 3/1972 | Bruton ...................... 251/63.4 |
| 3,730,214 A | * | 5/1973 | Brumm ...................... 137/488 |
| 4,087,074 A | * | 5/1978 | Massey et al. ................ 251/58 |
| 4,564,169 A | * | 1/1986 | Nordlund ..................... 251/58 |
| 4,724,857 A | | 2/1988 | Taylor |
| 4,949,936 A | * | 8/1990 | Messina ...................... 251/58 |
| 5,297,575 A | | 3/1994 | Taylor |
| 5,318,060 A | | 6/1994 | Taylor |
| 5,462,086 A | | 10/1995 | Taylor et al. |
| 5,575,306 A | | 11/1996 | Taylor |
| 5,685,329 A | | 11/1997 | Taylor |
| 5,727,586 A | * | 3/1998 | Taylor ...................... 137/68.11 |
| 6,325,088 B1 | | 12/2001 | Scantlin |
| 6,367,498 B1 | * | 4/2002 | Brazier et al. ................ 137/70 |

* cited by examiner

Primary Examiner—John Rivell
Assistant Examiner—Ramesh Krishnamurthy
(74) Attorney, Agent, or Firm—Fellers, Snider, et al.

(57) ABSTRACT

A pressure relief system for detecting and correcting an overpressure situation in a pressurized fluid. The system includes a pressure responsive member such as a buckling pin configured to mechanically collapse when a predetermined force is applied to the member. An actuator assembly axially compresses the member in response to the pressure of the fluid and rotates a first shaft upon mechanical collapse of the member. A bypass valve assembly establishes a bypass path for the fluid upon rotation of a second shaft. A clutch mechanism decouples the first and second shafts prior to and during initial stages of mechanical collapse of the member and subsequently couples the first and second shafts during remaining stages of mechanical collapse of the member. In this way, forces associated with the bypass valve assembly are isolated from the actuator assembly during steady state operation and during the initial stages of mechanical collapse.

19 Claims, 6 Drawing Sheets

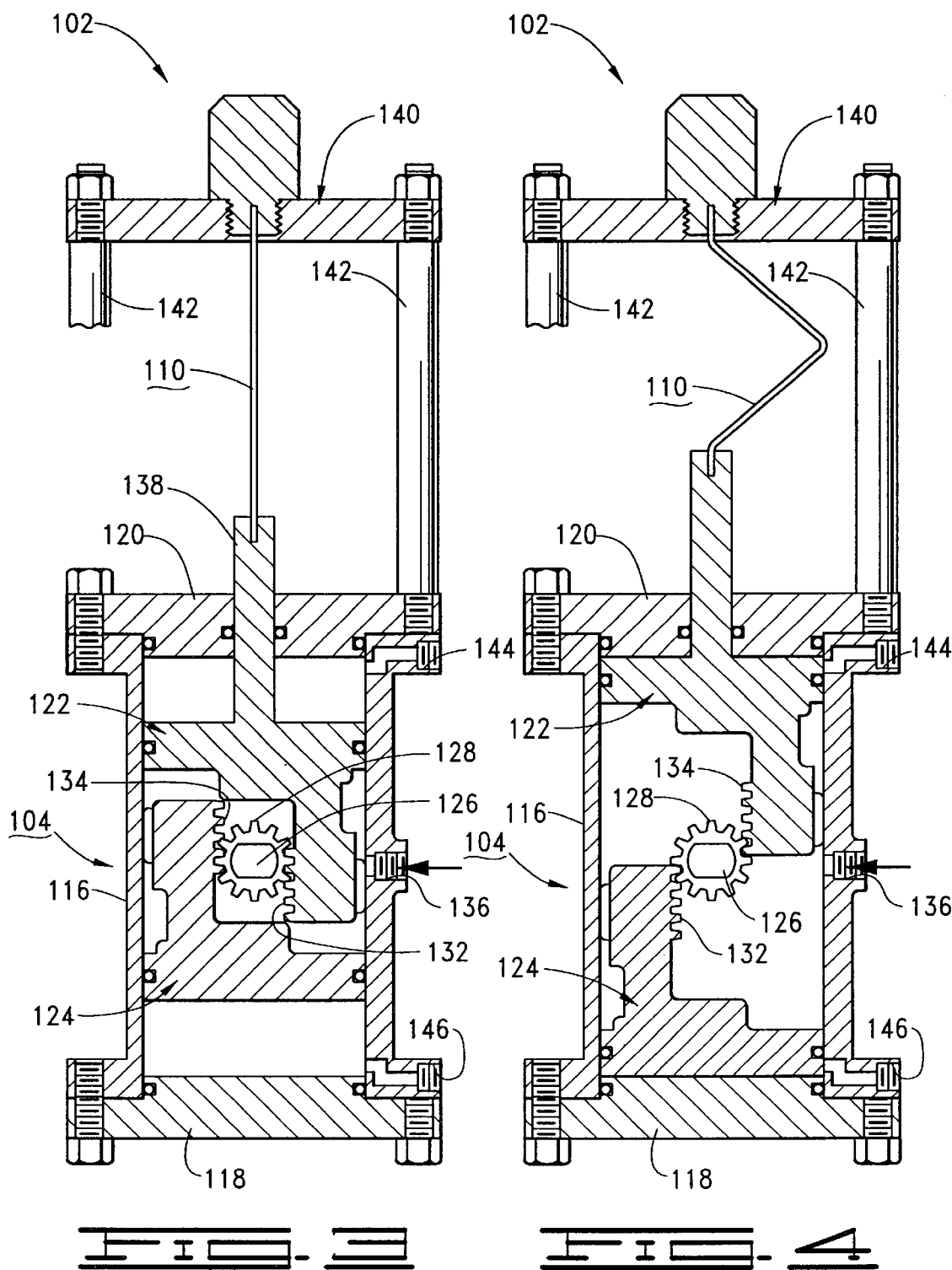

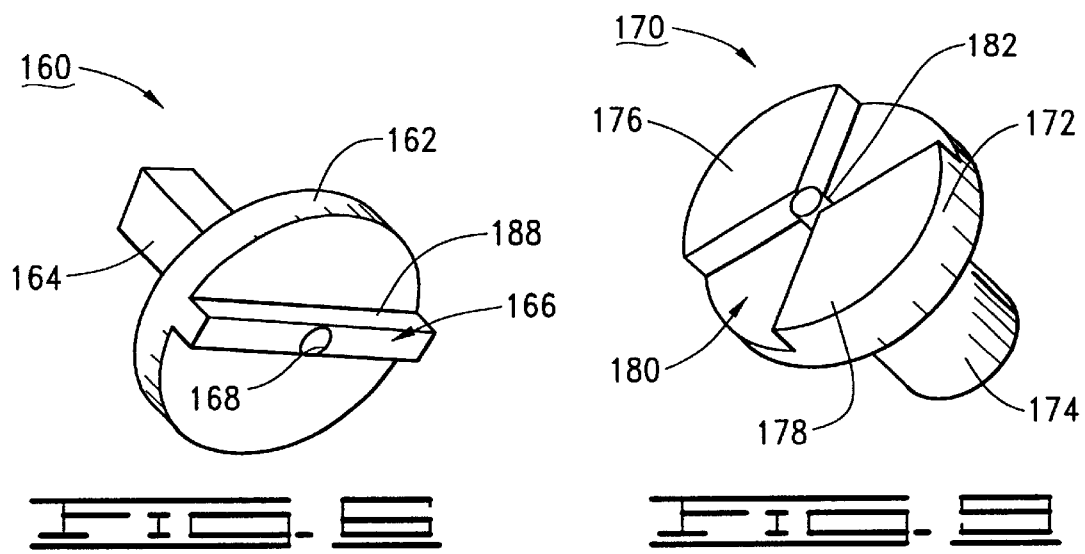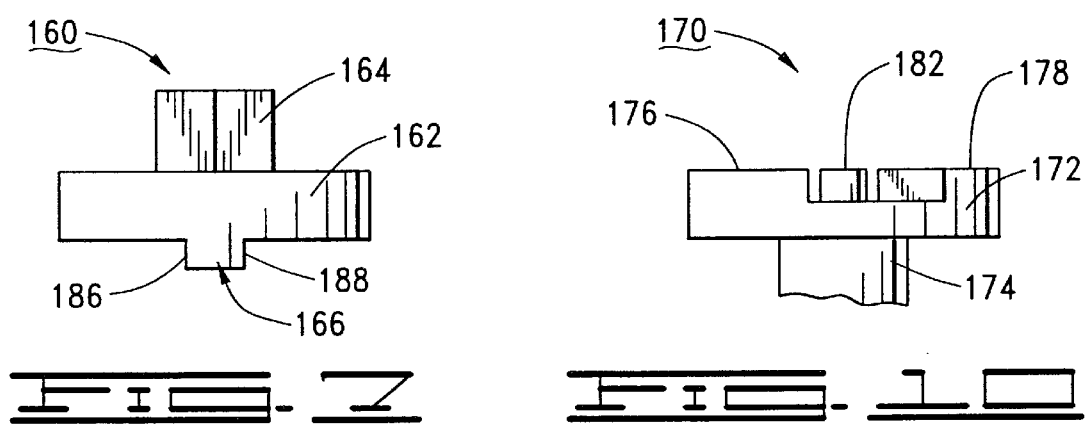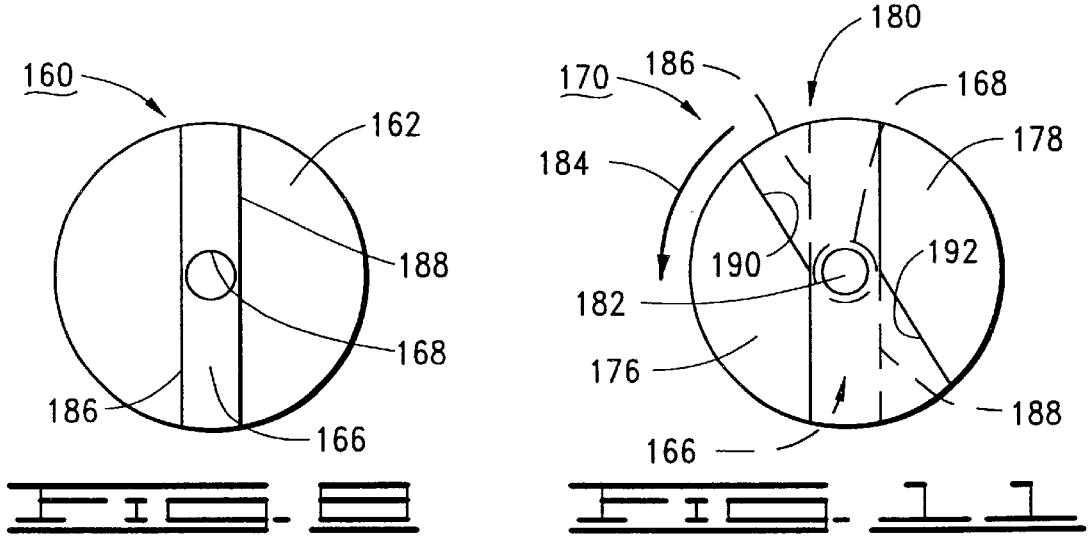

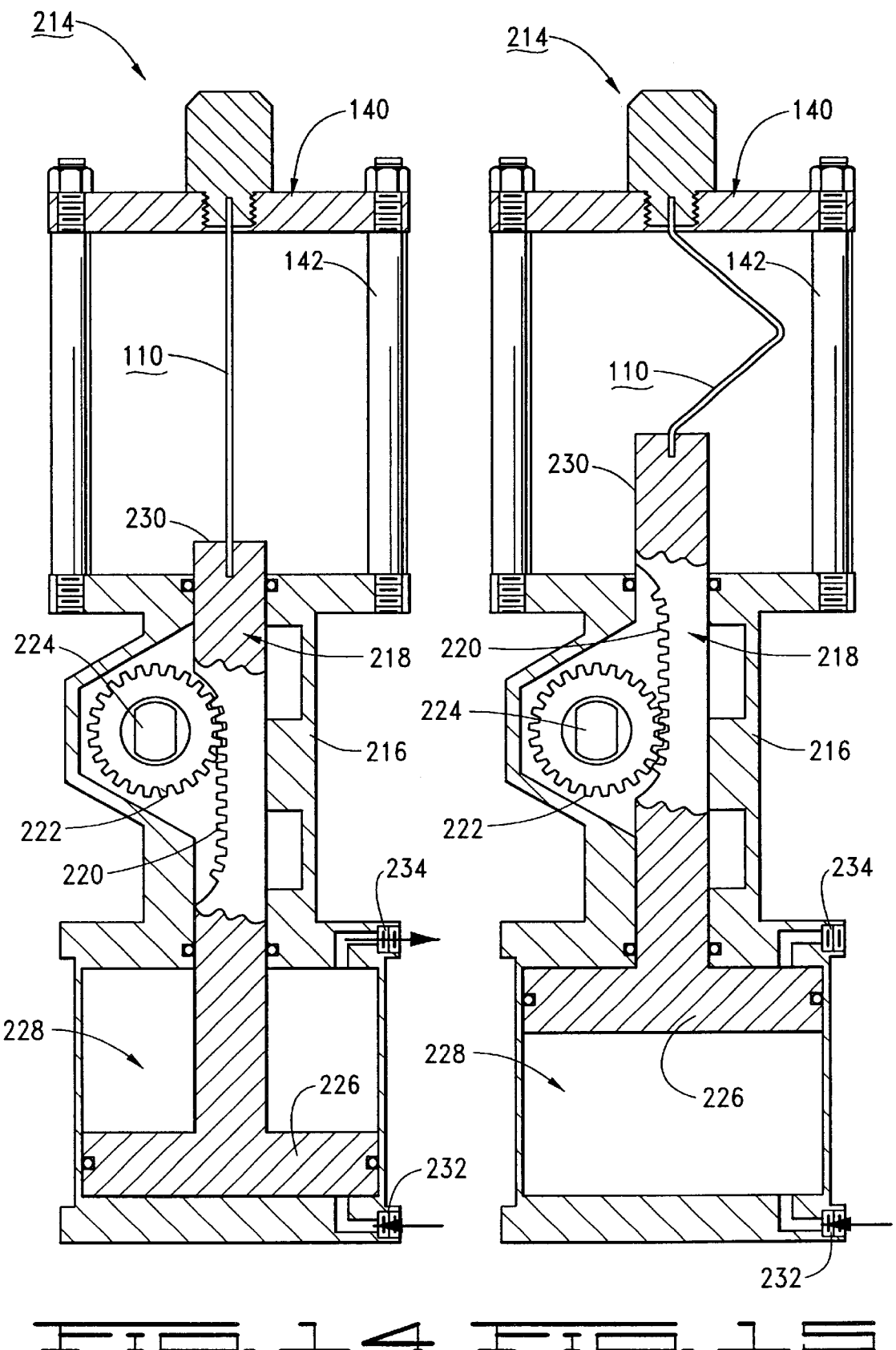

PRESSURE RELIEF SYSTEM WITH CLUTCH ACTIVATED VALVE

FIELD OF THE INVENTION

The present invention relates generally to pressurized fluid systems and more particularly, but not by way of limitation, to a pressure relief system which uses a clutch mechanism to isolate a pressure response assembly from forces associated with a valve assembly used to provide a bypass or shutdown path.

BACKGROUND

Pressurized fluid systems are typically provided with pressure relief capabilities to prevent the possibility of injury to humans and damage to equipment in the event of an overpressure situation. Such pressure relief systems typically use a pressure responsive member which mechanically fails when subjected to a large increase in fluidic pressure.

A particularly advantageous pressure relief system uses a buckling pin arrangement such as taught by U.S. Pat. No. 4,724,857 issued to Taylor. In such a system, the pin is placed under compressive load along an axial length of the pin by the pressure of the fluid. A sufficient increase in fluid pressure above a nominal operational level causes the pin to buckle, or collapse, allowing a plunger or other mechanism to move to a position where a bypass path can be established to direct the fluid to reduce the pressure to a safe operational level.

A valve can be advantageously configured to open (or close) in response to the collapse of a buckling pin, such as disclosed in copending U.S. patent application Ser. No. 10/020,611 filed by Taylor. Such a system uses a rotary actuator assembly with a rack and pinion arrangement. Lateral movement of the rack in response to a collapse of the pin induces rotation of the pinion. The pinion is coupled to the bypass valve to induce the desired rotary motion to open or close the valve.

While operable, under certain circumstances system forces can undesirably affect the set point at which the pressure responsive member begins to fail. For example, friction forces and fluidic pressure can tend to offset the compressive load upon a buckling pin if the pin actuation and the valve are directly coupled.

There is therefore a continued need for improvements in the art to increase the accuracy and repeatability of pressure relief systems, and it is to such improvements that the present invention is directed.

SUMMARY OF THE INVENTION

A pressure relief system is provided to detect an overpressure situation in a pressurized fluid.

In accordance with preferred embodiments, a pressure response assembly is provided with a pressure responsive member such as a buckling pin which is configured to mechanically fail when a predetermined force is applied to the member. An actuator assembly is coupled to the pressure response assembly and includes a housing in which a slidable piston is disposed.

The piston applies a compressive force upon the member in response to a pressure of pressurized fluid introduced into the housing. Preferably, a pinion is mounted to a first shaft adjacent the piston and engages a rack of the piston. When the pressure of the pressurized fluid reaches a sufficient level to induce mechanical failure of the member, the piston slides past and engages the pinion. Thus, movement of the piston collapses the member to a final failed condition and at the same time induces rotation in the first shaft.

A bypass valve assembly is provided with a second shaft. The valve assembly establishes an overpressure path for the pressurized fluid when the second shaft is rotated by a selected amount (such as a quarter-turn). The overpressure path can comprise a bypass path (redirection of flow) or a shutdown path (interruption of flow).

A clutch mechanism is provided between the first and second shafts. The clutch mechanism decouples the first and second shafts during steady state operation (i.e., prior to mechanical failure of the member) and during initial stages of mechanical failure of the member. The clutch mechanism subsequently couples the first and second shafts during remaining stages of mechanical failure of the member so that continued rotation of the first shaft results in rotation of the second shaft and establishment of the overpressure path for the fluid by the valve assembly. In this way, forces associated with the valve assembly are isolated from the actuator assembly prior to and during the initial stages of mechanical failure, allowing the set point at which mechanical failure of the member begins to be accurately controlled.

These and various other features and advantages which characterize the claimed invention will become apparent upon reading the following detailed description and upon reviewing the associated drawings.

BRIEF DESCRIPTION OF THE DRAWINGS

FIG. 4 shows the actuator assembly of FIG. 3 in an extended position.

FIG. 5 is a graphical illustration of a force versus deflection curve to generally illustrate force required to deflect and ultimately collapse a buckling pin of the pressure response assembly of FIG. 1.

FIG. 6 shows an isometric view of a first coupling member of a clutch mechanism shown in FIG. 1.

FIG. 7 is an elevational view of the first coupling member.

FIG. 8 is a bottom plan view of the first coupling member.

FIG. 9 shows an isometric view of a second coupling member of the clutch mechanism.

FIG. 10 is an elevational view of the second coupling member.

FIG. 11 is a top plan view of the second coupling member.

FIGS. 14 and 15 respectively show another preferred construction for the actuator assembly of FIG. 1, with FIG.

14 showing the actuator assembly in a normal, retracted position and FIG. 15 showing the actuator assembly in an extended position.

DETAILED DESCRIPTION

Figure 1:
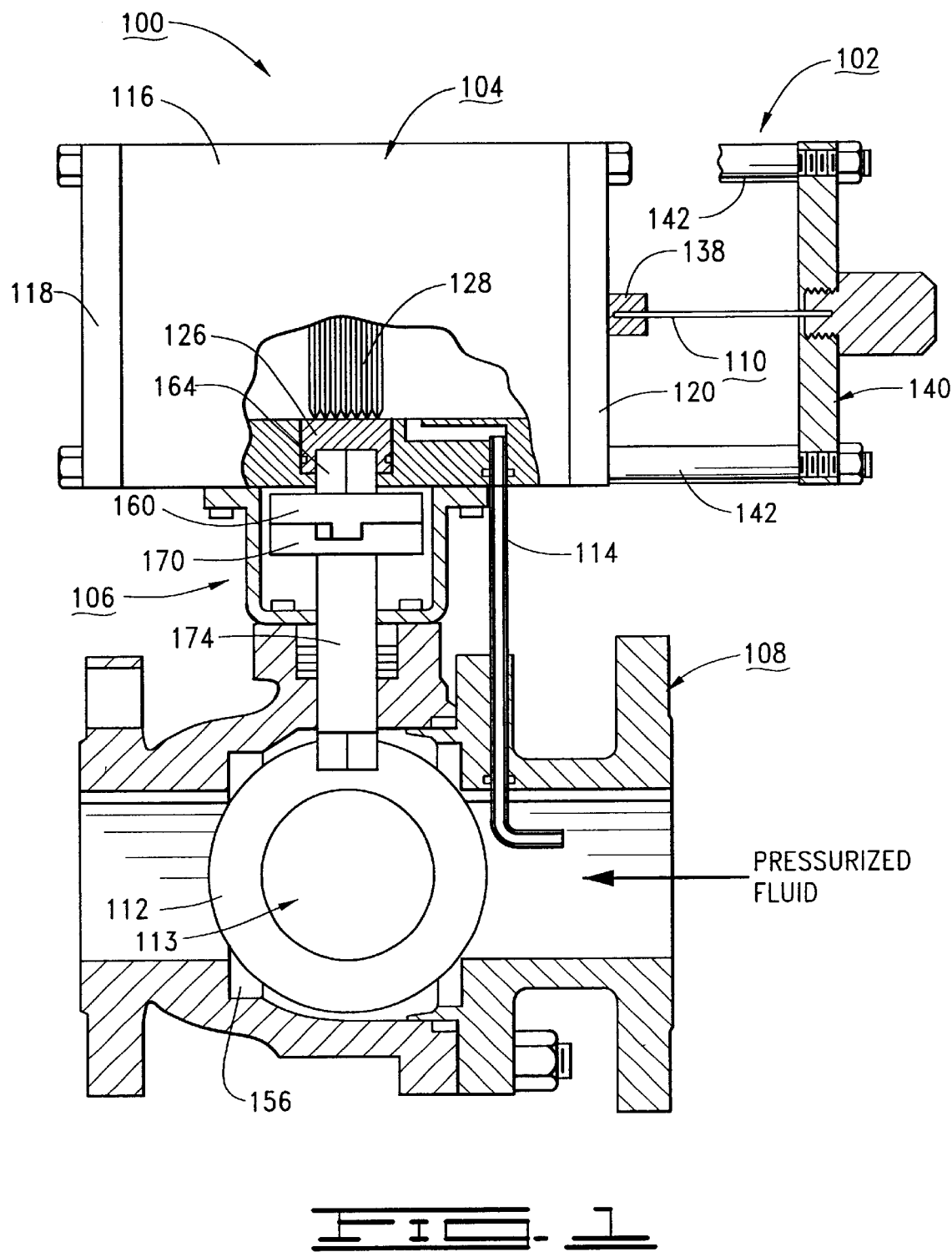
FIG. 1 is an isometric, partial cross-sectional view of a pressure relief system constructed in accordance with preferred embodiments of the present invention, with the system generally including a pressure response assembly, an actuator assembly, a clutch mechanism and a bypass valve assembly.

Reference is now made to FIG. 1 which shows a pressure relief system 100 constructed in accordance with preferred embodiments of the present invention. The pressure relief system 100 ("system") is preferably used as part of a larger pressurized fluid system in which a pressurized fluid is transported or otherwise processed. The pressure relief system 100 is used to detect an overpressure situation with the fluid and to provide an emergency overpressure path for the fluid to reduce the possibility of injury to humans and damage to equipment.

Figure 2:
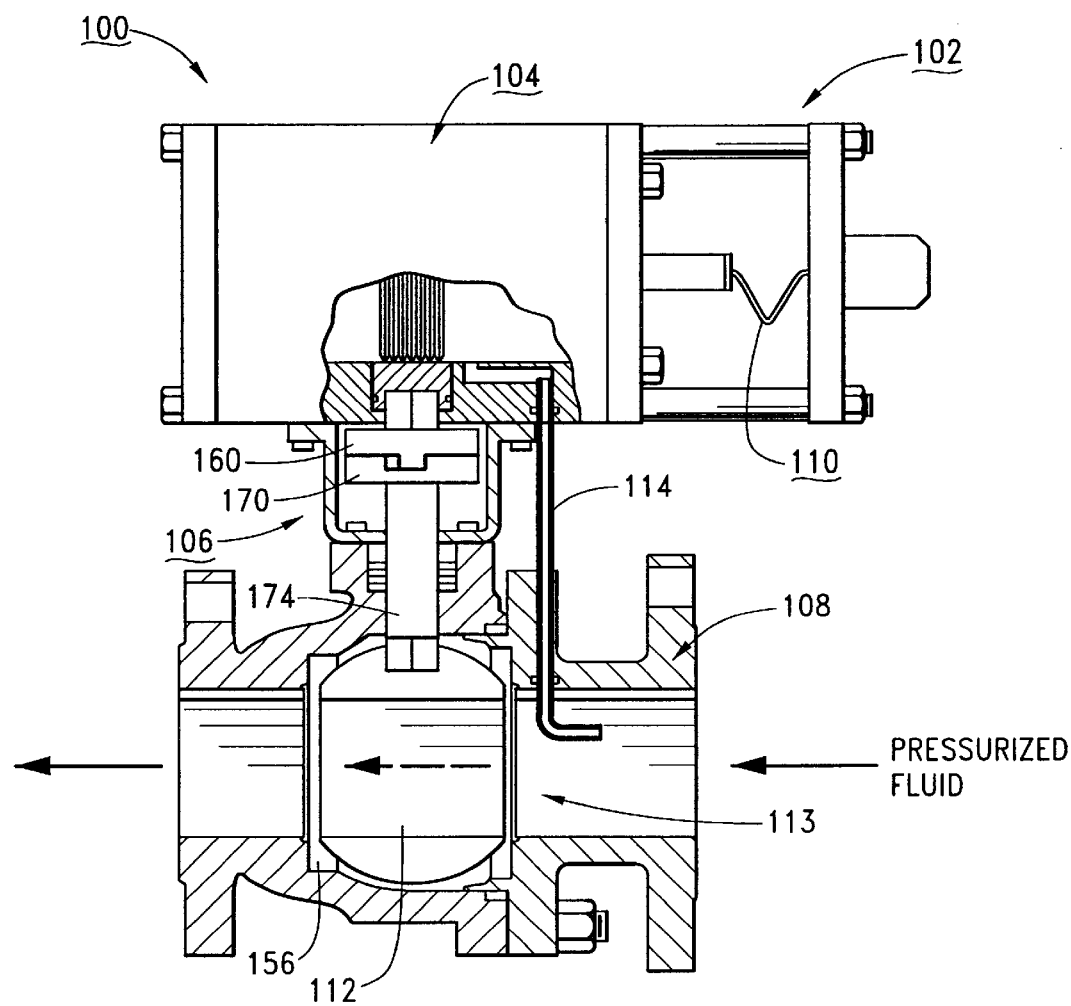
FIG. 2 shows the system of FIG. 1 with the valve assembly in the open position to represent the response of the system to an overpressure situation.

The system 100 is shown to generally include a pressure response assembly 102, an actuator assembly 104, a clutch mechanism 106 and a bypass valve assembly 108. The pressure response assembly 102 is shown to preferably comprise a buckling pin 110, although it is contemplated that other pressure responsive members can be used such as a shear pin or a frangible disk. The valve assembly 108 is shown to comprise a ball valve 112 with a central port 113, but other valve configurations can readily be used including a butterfly valve or a plug-type valve. The ball valve 112 is configured to be normally closed (NC), so that the system 100 operates to open the ball valve 112 to provide a bypass path for the fluid (as shown in FIG. 2). Alternatively, the ball valve 112 can be configured to be normally open (NO) so that the system operates to close the ball valve 112 to establish a shutoff path.

The clutch mechanism 106 advantageously operates to decouple the valve assembly 108 from the actuator assembly 104 during steady state operation and to subsequently engage the valve assembly 108 during an overpressure condition. As explained in greater detail below, pressurized fluid at a normal operational pressure is introduced into the actuator assembly 104 (such as by conduit 114). The fluid causes the actuator assembly 104 to compressively load the buckling pin 110 along the axial length of the pin. At such time that the pressure of the fluid rises above a selected level greater than the normal operational pressure, the axial force upon the buckling pin 110 will exceed the elastic limit of the pin and the pin will buckle (fail), as shown in FIG. 2. As the pin 110 begins to buckle, after a selected time delay the actuator assembly 104 engages the clutch mechanism 106 and rotates the ball valve 112 a quarter-turn to the open position.

Figure 3:
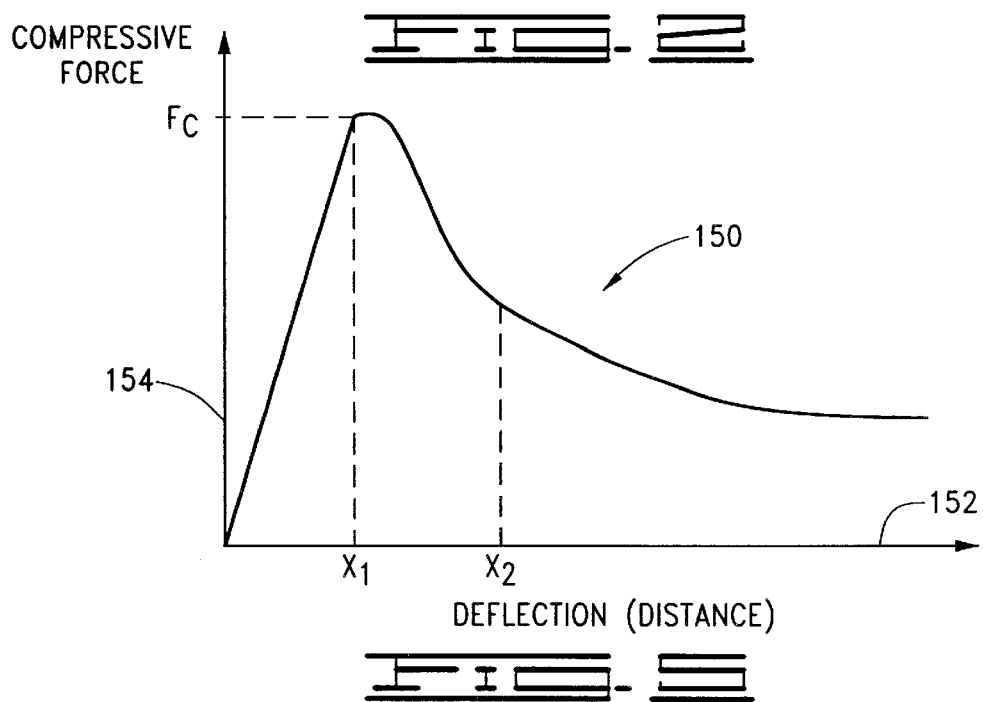
FIG. 3 is a cross-sectional view of the actuator assembly of the system of FIG. 1 in accordance with a preferred embodiment, with the actuator assembly placed in a normal, retracted position during steady state operation.

FIGS. 3 and 4 illustrate a first preferred construction of the actuator assembly 104. A body portion 116 cooperates with a flange 118 and a bonnet 120 to provide a sealed housing. Disposed within the housing are a pair of slidable, opposing pistons 122, 124 configured for movement toward opposing ends of the housing. A shaft 126 is transversely mounted by the body portion 116 and supports a pinion 128 (elongated rotary gear) which engages racks 132, 134 (teeth) in the respective pistons 122, 124. Pressurized fluid enters into the housing between the pistons 122, 124 via port 136.

An axial piston rod 138 projects from the piston 132 through the bonnet 120 to support one end of the buckling pin 110. The other end of the buckling pin is supported by a flange assembly 140. The flange assembly 140 is supported by standoff posts 142 mounted to the bonnet 120 as shown.

When the pressure upon the pistons 122, 124 induced by the pressurized fluid reaches a predetermined level, the pin 110 buckles and the pistons extend to the final position shown in FIG. 4. Linear movement of the pistons 122, 124 induces torque in the shaft 126 as a result of engagement of the racks 132, 134 and the pinion 128. Vent ports 144, 146 allow atmospheric air within the housing to escape as the actuator assembly 104 moves to the extended position.

The aforementioned clutch mechanism of FIGS. 1 and 2 serves to initially decouple the shaft 126 from the valve assembly 108 during steady state operation and as the pin 110 is initially buckled. Thereafter, as the pin 110 continues to buckle, the clutch mechanism 106 allows the shaft 126 to engage the valve assembly 108 to open the valve assembly. Before discussing a preferred configuration of the clutch mechanism 106, it will be helpful to first briefly discuss why such initial decoupling is beneficial.

First, it will be recognized that valve assemblies such as shown at 108 are not frictionless systems; significant amounts of stiction force (i.e., force required to initiate movement of the ball valve 112) and friction force (i.e., force required to continue movement of the ball valve 112) can be required to move the valve assembly 128 from the closed position to the open position (and vice versa). One source of these forces is the seal assemblies (such as 156) required to maintain an adequate seal against the fluidic pressure about the ball valve 112.

Another source of such forces is the pressure of the fluid upon the various surfaces of the ball valve 112 as the ball valve is rotated. It will be noted that operation of the ball valve 112 serves to create or restrict a flow stream of the fluid, and the pressure of the fluid as the ball valve is placed at various intermediate positions between opened and closed can impart significant resistance to the rotation of the valve. Such forces are also typically present in other valve configurations (particularly butterfly valves) and will tend to increase at higher operational pressures. Thus, initially decoupling the shaft 126 from the ball valve 112 advantageously prevents such forces from resisting compression of the pin 110 near the point of initial buckling of the pin and undesirably raising the set point for pin collapse.

Another related advantage to initially decoupling the shaft 126 from the valve assembly 108 relates to the manner in which a typical buckling pin collapses. FIG. 5 provides a generalized graphical representation of a buckling pin deflection curve 150 plotted against a deflection distance x-axis 152 and a compressive force magnitude y-axis 154. Forces below a critical force Fc allow the pin 110 to remains within its elastic limit; thus, increases in compressive force up to the critical force Fc will impart a slight bowing to the pin 110, but a relaxation of the compressive force will allow the pin 110 to return to the original straight configuration.

However, once the critical force Fc is reached (i.e., axial deflection reaches a distance X1), the pin 110 begins to buckle. The amount of force thereafter required to continue buckling (folding) of the pin is not constant, but drops off rapidly as shown by curve 150. Hence, instituting a short time delay before engagement of the valve assembly 108 upon pin failure advantageously allows the pressurized fluid to initiate compression of the pin 110 without being hindered by opposing forces from the valve assembly 108.

Reference is now made to FIGS. 6–11 which show a preferred construction of the clutch mechanism 106. FIGS. 6–8 illustrate a first coupling member 160 and FIGS. 9–11 illustrate a second coupling member 170 which mates with the first coupling member 160 in the manner shown in FIG. 1.

The first coupling member 160 comprises a circular, disc-shaped body portion 162. A post 164 projects from a top surface of the body portion 162 for rigid engagement with the shaft 126 (see cutaway in FIG. 1). A clutch engagement flange 166 projects from the body portion 162 and has an alignment pin aperture 168.

The second coupling member 170 has a circular, disc-shaped body portion 172 of nominally same diameter as the body portion 162 of the first coupling member 160. A shaft 174 couples the body portion 174 to the ball valve 112 (as shown in FIGS. 1 and 2). Opposed protrusions 176, 178 extend from the body portion 172 to form a generally bow-tie shaped channel 180 which receives the flange 166, although other configurations are readily contemplated. An alignment pin 182 extends into the aperture 168 of the flange 166 when the first and second coupling members 160, 170 are mated.

FIG. 11 shows the preferred orientation of the flange 168 (shown in broken line fashion) relative to the channel 180 when the system 100 is in the steady state condition. The direction of rotation of the shaft 126 upon buckling of the pin 110 is taken to be in the counter-clockwise direction with respect to FIG. 11, as indicated by 184. As the pin begins to fail, the flange 166 will freely rotate in the direction 184 until driver surfaces 186, 188 on opposing sides of the flange 168 engage contact surfaces 190, 192 of the protrusions 176, 178. This engagement causes the shaft 126 to be directly coupled to the shaft 174. Further rotation of the shaft 126 during the buckling of the pin causes the ball valve 112 to move to the final open position as shown in FIG. 2.

The amount of actuator travel and hence, the degrees of rotation of the shaft 126 will depend upon the desired angular actuation of the valve assembly 108 (in this case a quarter turn or 90 degrees) plus the respective initial angles between the driver surfaces 186, 188 and the contact surfaces 190, 192 (in this case 30 degrees). Any suitable initial angles can be used depending upon the requirements of a given application including up to 90 degrees or more.

Upon initial collapse of the pin 110, the elapsed time during which the flange 168 rotates freely within the channel 180 before contacting the surfaces 190, 192 constitutes a time delay of selected (albeit relatively short) duration. With reference again to FIG. 5, this delay can be represented as the time between X1 (initial buckling of the pin) and time X2 (engagement of driver surfaces 186, 188 with contact surfaces 190, 192). It can be seen that the force required to continue to collapse the pin 110 is significantly reduced at time X2, allowing a greater amount of the energy of the pressurized fluid between the pistons 122, 124 to be dedicated to opening the ball valve 112.

Generally, the flange 166 will tend to accelerate upon initiation of the failure of the pin 110. The abrupt contact between the respective driver surfaces 186, 188 and contact surfaces 190, 192 will provide an impulse that can aid in overcoming higher stiction forces (static friction) of the valve assembly 108, providing better valve assembly control. Other respective configurations of the flange and channel are readily contemplated, including a star configuration, multiple flanges and channels, etc.

Figures 12, 13:
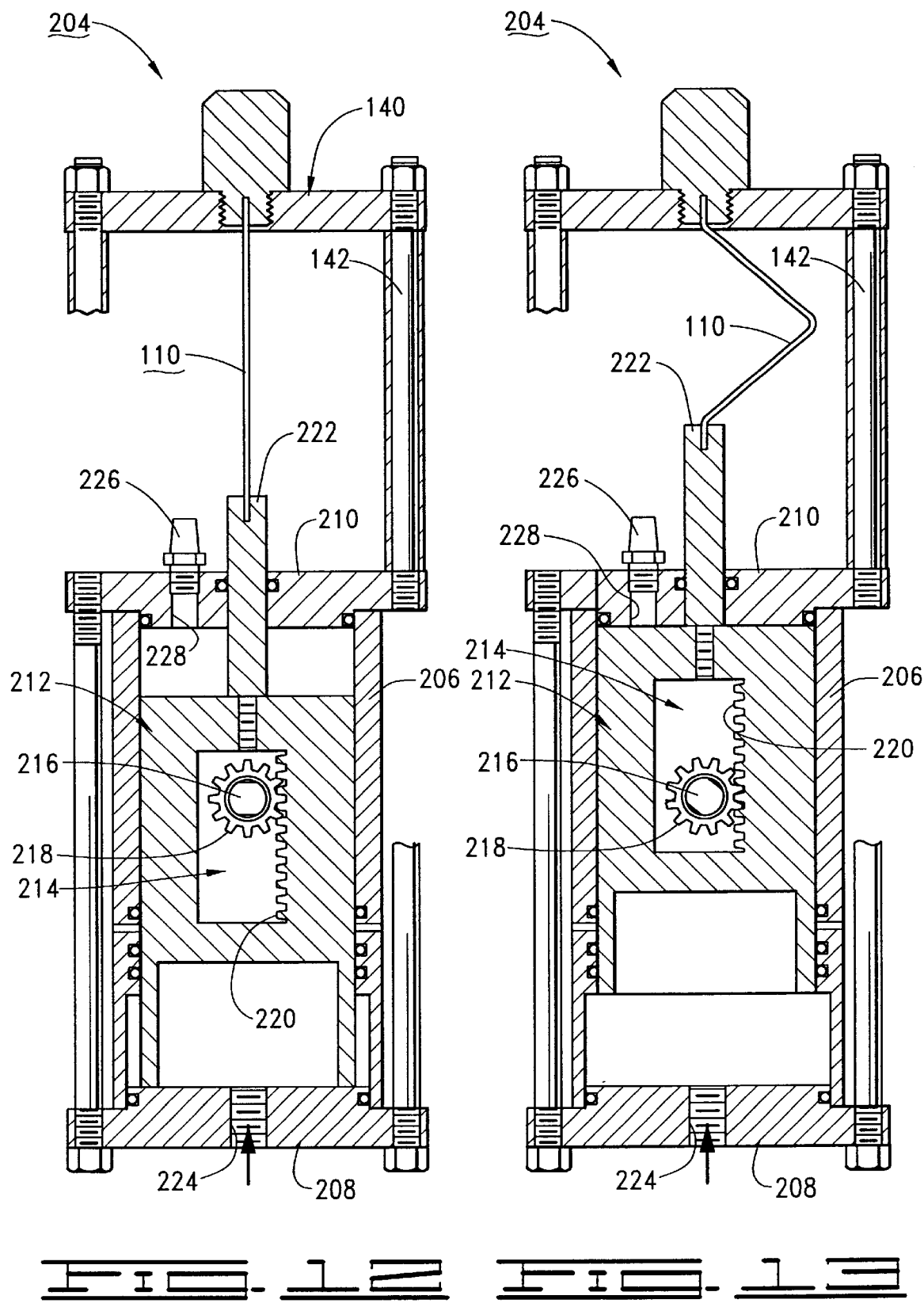
FIGS. 12 and 13 respectively show an alternative preferred construction for the actuator assembly of FIG. 1, with FIG. 12 showing the actuator assembly in a normal, retracted position and FIG. 13 showing the actuator assembly in an extended position.

FIGS. 12 and 13 illustrate an alternative actuator assembly 204 that can be advantageously used in lieu of the actuator assembly 104 discussed above. The actuator assembly 204 includes a body portion 206 which cooperates with a flange 208 and a bonnet 210 to form a sealed housing. A single plunger-type piston 212 is arranged for sliding movement within the body 206. An interior chamber 214 of the piston 212 accommodates a transversally mounted shaft 216 upon which a pinion 218 is mounted. A rack 220 of the piston 212 engages the pinion 218 as shown.

A post 222 extends from the piston 212 through the bonnet 210 to axially support the buckling pin 110. Pressurized fluid is introduced into the housing and bears against the piston 212 via port 224. A valve 226 within port 228 allows atmospheric air within the housing to escape upon movement of the piston 218.

The actuator assembly 204 is particularly useful in environments where dirty fluids (i.e. corrosive or otherwise contaminating fluids) are used, since the pressurized fluid does not come into contact with the rack 220 and pinion 218 and thus does not interfere with the operation or reliability of the system 100 over time.

FIGS. 14 and 15 illustrate another actuator assembly 214 which can be advantageously used in lieu of the actuator assemblies 104, 204 discussed above. As with the actuator assembly 204, the actuator assembly 214 is also useful in an environment where dirty fluids are used.

The actuator assembly 214 includes an elongated body portion 216 housing a piston 218. The piston 218 includes a rack 220 which engages a pinion 222 mounted to a shaft 224. The piston 218 further has a plunger 226 at one end which is slidable within a chamber 228 of the body portion 216 and a post 230 which supports the buckling pin 110. Pressurized fluid is introduced into the chamber via port 232 and atmospheric air within the chamber 228 is vented through port 234.

It will now be understood that the present invention is generally directed to a pressure relief system for detecting an overpressure situation in a pressurized fluid. In accordance with preferred embodiments, the system comprises first and second shafts (such as shafts 126, 174); a pressure responsive member configured to mechanically collapse when a predetermined force is applied to the member (such as the buckling pin 1100; first means for applying a force to the member in relation to a pressure of the pressurized fluid and for rotating the first shaft when the pressure exceeds a predetermined level sufficient to mechanically collapse the member (such as the actuator assemblies 104, 204, 214); second means for establishing a bypass path for the pressurized fluid upon rotation of the second shaft (such as the bypass valve assembly 108); and third means for decoupling the first and second shafts prior to and during initial stages of mechanical collapse of the member and for subsequently coupling the first and second shafts during remaining stages of mechanical collapse of the member so that forces associated with the second shaft are isolated from the first shaft prior to and during the initial stages of mechanical collapse (such as clutch mechanism 106).

For purposes of the appended claims, mechanical failure will be understood as describing the buckling of a buckling pin such as 110, the shearing of a shear pin, the bursting of a disc membrane, etc. Overpressure path will be understood to describe a redirection of the flow of the pressurized fluid, such as by a bypass path (as shown in FIG. 2) or a shutdown (interruption) in the original flow. Other piston-shaft coupling arrangements besides a rack and pinion arrangement to generate a torque are readily contemplated and are well within the ability of those skilled in the art to implement, such as configurations using belts, springs, chain drives, linkages, etc.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A pressure relief system for detecting an overpressure situation in a pressurized fluid, comprising:

first and second rotatable shafts;

a pressure responsive member configured to mechanically fail when a predetermined force is applied to the member;

first means for applying a force to the member in relation to a pressure of the pressurized fluid and for rotating the first shaft when the pressure exceeds a predetermined level sufficient to induce mechanical failure of the member;

second means for establishing an overpressure path for the pressurized fluid upon rotation of the second shaft; and third means for decoupling the first and second shafts prior to and during initial stages of mechanical failure of the member and for subsequently coupling the first and second shafts during remaining stages of mechanical failure of the member so that forces associated with the second shaft are isolated from the first shaft prior to and during the initial stages of mechanical failure.

2. The pressure relief system of claim 1, wherein the third means comprises a clutch mechanism comprising adjacent first and second coupling members respectively coupled to the first and second shafts.

3. The pressure relief system of claim 2, wherein a selected coupling member has a flange which extends into a channel of the remaining coupling member, the flange comprising a driver surface which forms a gap with a contact surface of the channel prior to and during the initial mechanical failure of the member, and wherein the driver surface subsequently contacts the contact surface during the remaining stages of mechanical failure so that rotation of the first shaft induces rotation in the second shaft.

4. The pressure relief system of claim 3, wherein the first and second coupling members are aligned for respective axial rotation about an axis along which the first and second shafts respectively align.

5. The pressure relief system of claim 1, wherein the pressure responsive member comprises a buckling pin which is compressively loaded by the first means along an axial length of the pin.

6. The pressure relief system of claim 1, wherein the first means comprises a rotary actuator assembly comprising a housing in which a slidable piston is disposed, the piston applying a compressive force upon the member in response to introduction of the pressurized fluid into the housing, the piston comprising a rack which engages a pinion mounted to the first shaft.

7. The pressure relief system of claim 6, wherein the pressurized fluid introduced into the housing comes into contact with the rack and pinion.

8. The pressure relief system of claim 6, wherein the rack and pinion are isolated from the pressurized fluid so that the pressurized fluid nominally does not come into contact with the rack and pinion.

9. The pressure relief system of claim 1, wherein the second means comprises a valve assembly.

10. The pressure relief system of claim 9, wherein the valve assembly comprises a ball valve.

11. A pressure relief system for detecting an overpressure situation in a pressurized fluid, comprising:

a pressure response assembly having a pressure responsive member configured to mechanically fail when a predetermined force is applied to the member;

an actuator assembly coupled to the pressure response assembly and comprising a housing in which a slidable piston is disposed, the piston applying a compressive force upon the member in response to a pressure of pressurized fluid introduced into the housing, the actuator assembly further comprising a first shaft which rotates upon movement of the piston when the pressure of the pressurized fluid reaches a sufficient level to initiate mechanical failure of the member;

a valve assembly having a second shaft, the valve assembly establishing an overpressure path for the pressurized fluid upon rotation of the second shaft; and a clutch mechanism coupled between the first and second shafts which decouples the first and second shafts prior to and during initial stages of mechanical failure of the member and which couples the first and second shafts during remaining stages of mechanical failure of the member so that forces associated with the valve assembly are isolated from the actuator assembly prior to and during the initial stages of mechanical failure.

12. The pressure relief system of claim 11, wherein the actuator assembly further comprises a pinion affixed to the first shaft and the piston comprises a rack which engages the pinion.

13. The pressure relief system of claim 11, wherein the clutch mechanism comprises adjacent first and second coupling members, the first coupling member coupled to the first shaft and the second coupling member coupled to the second shaft.

14. The pressure relief system of claim 13, wherein a selected coupling member has a flange which extends into a channel of the remaining coupling member, the flange comprising a driver surface which forms a gap with a contact surface of the channel prior to and during the initial mechanical failure of the member, and wherein the driver surface subsequently contacts the contact surface during the remaining stages of mechanical failure so that the rotation of the first shaft induces rotation in the second shaft.

15. The pressure relief system of claim 14, wherein the first and second coupling members are aligned for respective axial rotation about an axis along which the first and second shafts respectively align.

16. The pressure relief system of claim 11, wherein the pressure responsive member comprises a buckling pin which is compressively loaded by the piston along an axial length of the pin.

17. The pressure relief system of claim 11, wherein the pressurized fluid introduced into the housing comes into contact with the rack and pinion.

18. The pressure relief system of claim 11, wherein the rack and pinion are isolated from the pressurized fluid so that the pressurized fluid nominally does not come into contact with the rack and pinion.

19. The pressure relief system of claim 11, wherein the bypass valve assembly comprises a ball valve.

* * * * *